(12) United States Patent
Igarashi

(10) Patent No.: US 8,508,802 B2
(45) Date of Patent: Aug. 13, 2013

(54) PRINTING CONTROL APPARATUS AND PRINTING CONTROL METHOD

(75) Inventor: Toshiaki Igarashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1559 days.

(21) Appl. No.: 11/415,247

(22) Filed: May 2, 2006

(65) Prior Publication Data

US 2006/0250631 A1 Nov. 9, 2006

(30) Foreign Application Priority Data

May 9, 2005 (JP) ................................. 2005-136502

(51) Int. Cl.
 *H04N 1/40* (2006.01)
 *G06F 3/12* (2006.01)
 *G06K 15/00* (2006.01)

(52) U.S. Cl.
 USPC ....... 358/3.23; 358/1.13; 358/1.14; 358/1.15; 358/3.21; 358/3.22

(58) Field of Classification Search
 USPC ............. 358/1.9, 1.13, 1.14, 1.15, 3.23, 3.21, 358/3.22; 399/75, 76, 79, 81, 82
 See application file for complete search history.

(56) References Cited

U.S. PATENT DOCUMENTS

| | | | | |
|---|---|---|---|---|
| 5,933,584 | A * | 8/1999 | Maniwa | 358/1.15 |
| 6,202,092 | B1 * | 3/2001 | Takimoto | 709/225 |
| 6,498,912 | B1 * | 12/2002 | Leni et al. | 399/79 |
| 6,636,903 | B2 * | 10/2003 | Endoh et al. | 710/8 |
| 6,972,857 | B2 * | 12/2005 | Mantell et al. | 358/1.14 |
| 6,985,244 | B1 * | 1/2006 | Bhogal et al. | 358/1.15 |
| 7,072,799 | B2 * | 7/2006 | Kojima | 702/184 |
| 7,110,917 | B2 * | 9/2006 | Matsuura et al. | 702/185 |

(Continued)

FOREIGN PATENT DOCUMENTS

| JP | 11-085419 | | 3/1999 |
|---|---|---|---|
| JP | 2002-123140 | A | 4/2002 |

(Continued)

OTHER PUBLICATIONS

Japanese Office Action dated Feb. 19, 2010 concerning the Japanese Patent Application No. 2005-136502.

(Continued)

*Primary Examiner* — Charlotte M Baker
*Assistant Examiner* — Jonathan Beckley
(74) *Attorney, Agent, or Firm* — Fitzpatrick, Cella, Harper & Scinto

(57) ABSTRACT

According to this invention, a printing control program which is recorded on a computer-readable recording medium and generates default print setting information when a computer prints includes a code for a management table creation step of creating a setting management table in which at least one threshold is set for a restricted item in a print process and the setting value of at least one item belonging to the print setting information is related to the range of the value of the restricted item defined by the threshold, a code for a read step of acquiring the current value of the restricted item, and reading, from the management table, the setting value of at least one item that belongs to the print setting information and is related to the range of the value to which the value belongs, and a code for a creation step of creating and saving print setting information containing the setting value read in the read step as the setting of the item.

18 Claims, 10 Drawing Sheets

(56) References Cited

U.S. PATENT DOCUMENTS

| | | | |
|---|---|---|---|
| 7,167,253 B2 * | 1/2007 | Endoh et al. | 358/1.14 |
| 7,400,427 B2 * | 7/2008 | Honma | 358/1.15 |
| 7,426,045 B2 * | 9/2008 | Horiyama | 358/1.13 |
| 7,426,352 B2 * | 9/2008 | Moriyama et al. | 399/43 |
| 7,436,552 B2 * | 10/2008 | Nozato | 358/406 |
| 7,545,528 B2 * | 6/2009 | Takabayashi et al. | 358/1.15 |
| 7,561,291 B2 * | 7/2009 | Horiyama | 358/1.15 |
| 7,586,639 B2 * | 9/2009 | Nakata | 358/1.6 |
| 7,609,412 B2 * | 10/2009 | Maruyama | 358/1.9 |
| 2004/0130744 A1 * | 7/2004 | Wu et al. | 358/1.15 |
| 2004/0156056 A1 * | 8/2004 | Sawada | 358/1.2 |
| 2005/0275867 A1 * | 12/2005 | Higashiura et al. | 358/1.14 |
| 2006/0203277 A1 * | 9/2006 | Suzuki | 358/1.14 |

FOREIGN PATENT DOCUMENTS

| | | |
|---|---|---|
| JP | 2004-213132 | 7/2004 |
| JP | 2004220532 A | 8/2004 |
| JP | 2005031784 A | 2/2005 |
| JP | 2005-107639 A | 4/2005 |

OTHER PUBLICATIONS

Japanese Office Action concerning Japanese Patent Application No. 2005-136502.

* cited by examiner

| USER NAME | TARGET PRINTER | RESTRICTED ITEM ID | CURRENT VALUE | UPPER LIMIT | ALLOWABLE MAXIMUM VALUE | RELATED ITEM | STANDARD VALUE | VALUE WITHIN ALLOWABLE MAXIMUM VALUE | VALUE EXCEEDING ALLOWABLE MAXIMUM VALUE |
|---|---|---|---|---|---|---|---|---|---|
| SUZUKI | MULTI FUNCTION PRINTER 101 | NUMBER OF PRINT SHEETS | 100 SHEETS | 100 SHEETS | 120 SHEETS | PAGE LAYOUT | 1 PAGE / SHEET (VARIABLE) | 2 PAGE / SHEET (VARIABLE) | 4 PAGES / SHEET (VARIABLE) |
| | | | | | | PRINTING METHOD | SINGLE-SIDED (VARIABLE) | DOUBLE-SIDED (VARIABLE) | DOUBLE-SIDED (FIXED) |
| | | | | | | PAPER SIZE | A4 (VARIABLE) | A4 (VARIABLE) | A4 (FIXED) |
| | | COLOR RATIO | 40% | 50% | 60% | PRINT COLOR | COLOR (VARIABLE) | COLOR (VARIABLE) | MONOCHROME (FIXED) |
| 501 | 502 | 503 | 504 | 505 | 506 | 507 | 508 | 509 | 510 |

| PRINTER ID | ID | USER NAME | TOTAL PAGE COUNT | PAPER SIZE | PRINT COLOR | PRINTING METHOD | PRINT RESULT |
|---|---|---|---|---|---|---|---|
| MULTI FUNCTION PRINTER 101 | 1 | SUZUKI | 123 | A4 | COLOR | DOUBLE-SIDED | SUCCESSFUL |
| | 2 | TANAKA | 56 | B4 | MONOCHROME | SINGLE-SIDED | FAILED |
| | 3 | SATO | 78 | A4 | COLOR | DOUBLE-SIDED | SUCCESSFUL |
| | 4 | SATO | 90 | A3 | MONOCHROME | SINGLE-SIDED | SUCCESSFUL |

| FUNCTION | SETTING VALUE | MODE |
|---|---|---|
| PAGE LAYOUT | 2 PAGES / SHEET | FIXED VALUE |
| PRINTING METHOD | SINGLE-SIDED | VARIABLE VALUE |
| PAPER SIZE | A4 | VARIABLE VALUE |
| PRINT COLOR | COLOR | VARIABLE VALUE |
| PRINT QUALITY | FINE | VARIABLE VALUE |
| TONER SAVING | OFF | FIXED VALUE |

| RESTRICTED ITEM | RULE |
| --- | --- |
| NUMBER OF PRINT SHEETS | if (CURRENT VALUE>ALLOWABLE RANGE) {<br>UPPER LIMIT=UPPER LIMIT*0.9;<br>ALLOWABLE MAXIMUM VALUE=<br>UPPER LIMIT+15 SHEETS;}<br><br>else if (UPPER LIMIT<CURRENT VALUE<<br>ALLOWABLE MAXIMUM VALUE) {<br>UPPER LIMIT=UPPER LIMIT*0.9;} |
| COLOR RATIO | if (CURRENT VALUE><br>ALLOWABLE MAXIMUM VALUE) {<br>UPPER LIMIT=UPPER LIMIT*0.9;<br>ALLOWABLE RANGE=UPPER LIMIT+10%;}<br><br>else if (UPPER LIMIT<CURRENT VALUE<<br>ALLOWABLE MAXIMUM VALUE) {<br>UPPER LIMIT=UPPER LIMIT*0.9;} |

PRINTING CONTROL APPARATUS AND PRINTING CONTROL METHOD

FIELD OF THE INVENTION

The present invention relates to a printing system configured by connecting, for example, a printing apparatus and a computer which uses the printing apparatus and, more particularly, to a printing control system which allows the administrator of the printing system to restrict printing from each computer.

BACKGROUND OF THE INVENTION

Conventionally, in order to reduce TCO (Total Cost of Ownership) in the office, management operation is done in which the administrator of the printing control system sets the upper limit of, e.g., the number of printouts for each department or each user in the department in using a printer or copying machine. An example of this management operation is a process when printing by a given print operation exceeds the upper limit of the number of print sheets (see patent reference 1). In patent reference 1, when printing by a given user exceeds the upper limit of the number of print sheets, the user is permitted to continue printing within a predetermined allowable range.

Another management operation provides a printing control system which restricts print functions executable by the user by customizing a printer driver, particularly default values (initial values) of print settings accessory to the printer driver and distributing the customized printer driver to a user PC. As an example of this printing control system, the system comprehensively manages printer drivers to be installed in PCs in the printing system, and distributes an arbitrary driver to each PC with arbitrary initial settings by using the network (see patent reference 2). In patent reference 2, the administrator of the printing control system creates an initial driver setting file in advance, and saves it together with a printer driver in a driver management server. In distributing a driver, a set of the printer driver and setting file is distributed to the PC.

[Patent Reference 1] Japanese Patent Laid-Open No. 11-085419

[Patent Reference 2] Japanese Patent Laid-Open No. 2004-213132

However, in the former one of the above prior arts, no means for allowing the user to recognize that printing exceeds the upper limit of the number of print sheets is prepared. Although printing exceeds the upper limit of the number of print sheets, the user may execute printing from the PC.

In the latter prior art, when printing by a given user exceeds the upper limit of the number of print sheets and it becomes difficult to execute printing with the current driver settings, a print request from the user can be restricted by distributing a new setting file. However, every time a new restriction is imposed, the administrator of the printing control system must create and distribute a setting file, increasing the burden on the administrator of the printing control system.

That is, according to the prior arts, much labor is required for the administrator to flexibly control printouts by each user in the printing control system which restricts printouts by each user.

SUMMARY OF THE INVENTION

The present invention has been made in consideration of the above situation, and has as its object to provide a printing control apparatus and printing control method which allow the administrator to flexibly control printouts by each user in a printing control system that restricts printouts by each user, and a program for implementing the printing control apparatus and printing control method.

To achieve the above object, the present invention comprises the following arrangement. That is, a printing control apparatus which generates default print setting information when a printing apparatus prints, comprising: management table creation means for creating a setting management table in which at least one threshold is set for a restricted item in a print process and a setting value of at least one item belonging to the print setting information is related to a range of a value of the restricted item defined by the threshold; read means for acquiring a current value of the restricted item, and reading, from the management table, the setting value of at least one item that belongs to the print setting information and is related to the range of the value to which the value belongs; and creation means for creating and saving print setting information containing the setting value read by the read means as a setting of the item.

According to the invention defined in claim 1, print setting information containing the setting value of at least one item which belongs to the print setting information and is associated with the current value of the restricted item is created on the basis of a setting management table in which the setting value of at least one item belonging to default print setting information is related to the range of the value of the restricted item. A print restriction can be flexibly changed by changing the setting management table, and thus detailed output management can be implemented. More specifically, a restriction on a restricted item can be flexibly changed by changing a threshold contained in the setting management table or changing the setting value of at least one item which belongs to the print setting information and is associated with the restricted item.

According to the invention defined in claim 2, since the management table is created for each user, a print restriction can be changed for each user.

According to the invention defined in claim 3, printer driver setting information which is created on the basis of the current value of a restricted item and the management table can be transmitted to another computer which utilizes a printing apparatus, and can be used for printing.

According to the invention defined in claim 4, when current default print setting information and created default print setting information do not coincide with each other, the created default print setting information is transmitted to another computer which utilizes a printing apparatus, thereby reducing the information amount to be transmitted and preventing an unnecessary load on another computer.

According to the invention defined in claim 5, the current value of a restricted item is acquired from history information accumulated in the printing apparatus. The use restriction of the printing apparatus can be reflected in print setting information in accordance with the actual use status of the printing apparatus.

According to the invention defined in claim 6, the current value of a restricted item is acquired from history information accumulated in another computer. The use restriction of the computer can be reflected in print setting information in accordance with the actual use status of the computer.

According to the invention defined in claim 7, either the number of print sheets or the color ratio is selected as a restricted item, and another related item can be restricted in accordance with the number of print sheets.

According to the invention defined in claim 8, one of the page layout, printing method, paper size, and print color is selected as at least one item belonging to the print setting information related to the range of the value of the restricted item. One of the page layout, printing method, paper size, and print color can be restricted in accordance with the value of the restricted item.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a table showing an example of a printer driver setting management table;

FIG. 6 is a table showing an example of a print history;

FIG. 7 is a table showing an example of printer driver settings;

FIG. 9 is a table showing an example of an update rule management table; and

DETAILED DESCRIPTION OF THE PREFERRED EMBODIMENTS

First Embodiment

The first embodiment of the present invention will be described below with reference to the accompanying drawings. The first embodiment will describe an operation when the administrator changes the print restriction of each user in a printing control system which imposes a print restriction on each user and monitors the print status.

Figure 1:
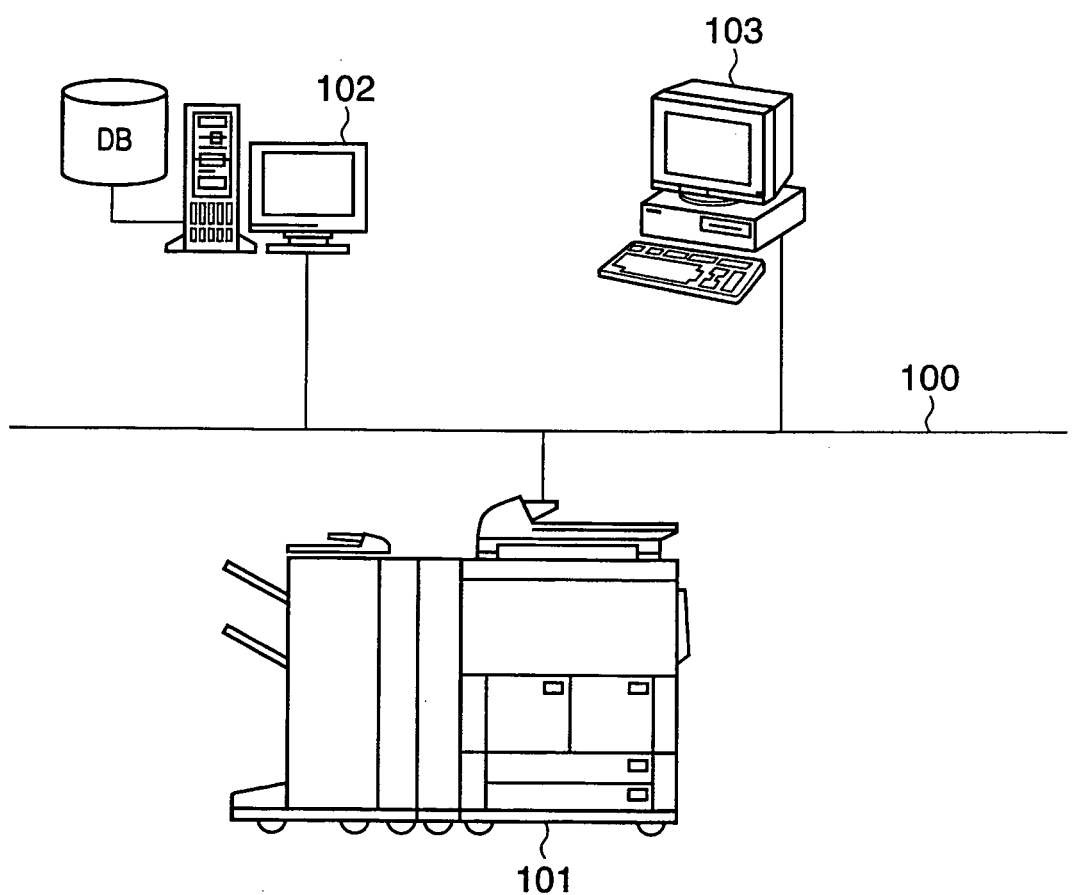
FIG. 1 is a view showing the configuration of a printing control system according to an embodiment.

FIG. 1 is a view showing the configuration of the printing control system. In FIG. 1, reference numeral 101 denotes a multi function printer having the functions of a printing apparatus. Reference numeral 102 denotes a server PC in which the program of the printing control system according to the first embodiment runs. Reference numeral 103 denotes a client PC which receives a printer driver distributed from the program of the printing control system running on the server PC 102, and executes various print operations via the printer driver. These apparatuses are connected to a network via a LAN 100.

<Configuration of Multi Function Printer (Printing Apparatus)>

Figure 2:
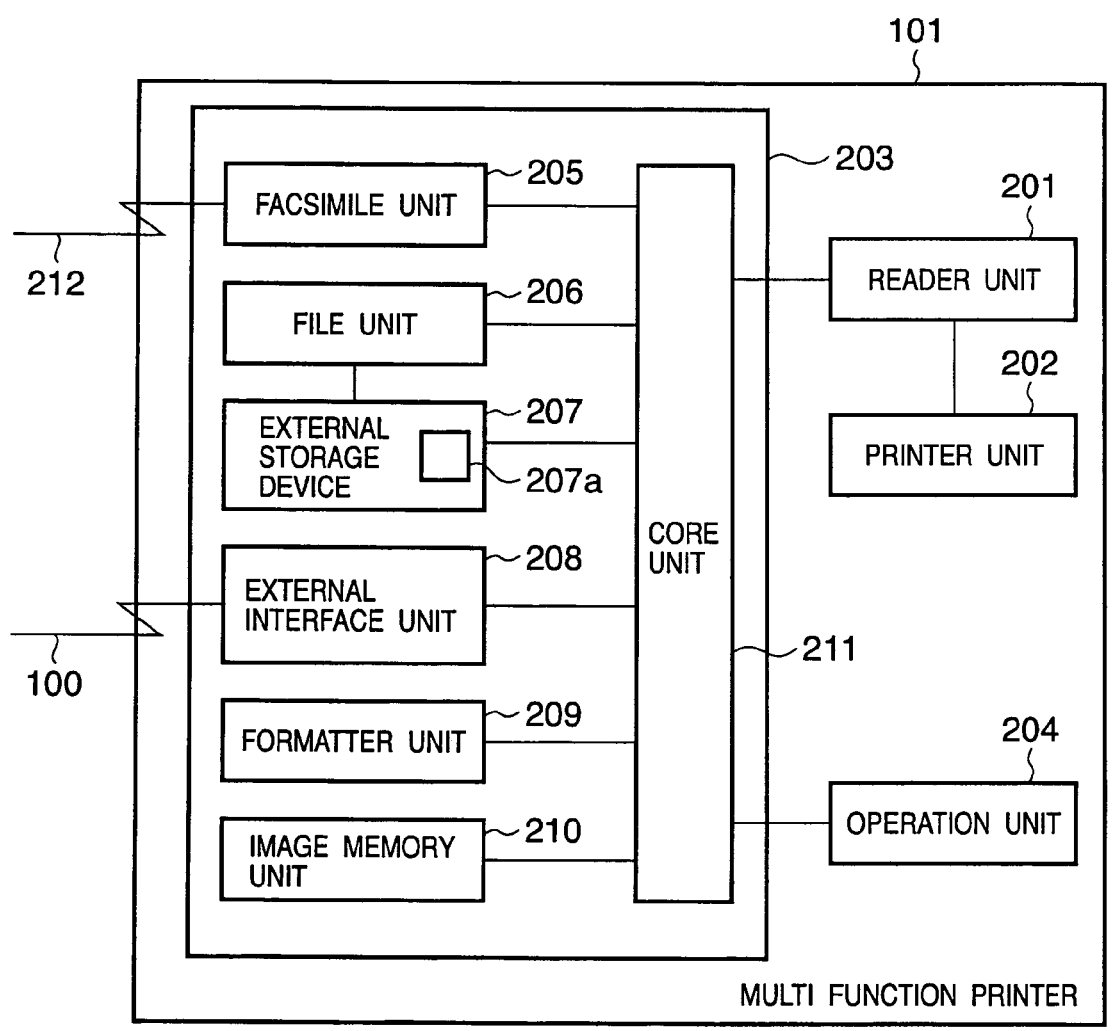
FIG. 2 is a block diagram showing the internal configuration of a multi function printer.

FIG. 2 is a block diagram for explaining the internal configuration of the multi function printer 101. In FIG. 2, the multi function printer 101 is configured by integrating scanner, printer, copy, and FAX functions. The multi function printer 101 is connected to another communication apparatus via a public network 212. In the first embodiment, the printer 101 is illustrated as a multi function printer, but may be not the multi function printer but a digital copying machine, a printer with a copy function, or a printer with a single function. The multi function printer 101 is mainly formed from a reader unit 201, printer unit 202, image input/output control unit 203, and operation unit 204. The reader unit 201 is connected to the printer unit 202 and image input/output control unit 203. The reader unit 201 reads a document image in accordance with an instruction from the operation unit 204, and outputs the read image data to the printer unit 202 or image input/output control unit 203.

The printer unit 202 prints, on print sheets, image data output from the reader unit 201 and image input/output control unit 203. The image input/output control unit 203 is connected to the LAN and public network, inputs/outputs image data, and analyzes and controls a job (print instruction or the like). The image input/output control unit 203 is made up of a facsimile unit 205, file unit 206, external interface unit 208, PDL formatter unit 209, image memory unit 210, and core unit 211. The facsimile unit 205 is connected to the core unit 211 and public network, decompresses compressed image data received from the public network, and transmits the decompressed image data to the core unit 211. The facsimile unit 205 compresses image data transmitted from the core unit 211, and transmits the compressed image data to the public network via a public line. The file unit 206 is connected to the core unit 211 and an external storage device 207, compresses image data transmitted from the core unit 211, and stores the compressed image data together with a keyword for searching for it in the external storage device 207 which can be formed from a hard disk or the like. The file unit 206 searches for compressed image data stored in the external storage device 207 on the basis of a keyword transmitted from the core unit 211, reads out the compressed image data, decompresses it, and transmits the decompressed image data to the core unit 211. The external storage device 207 saves print history information 207a and the like. In addition, the external storage device 207 also temporarily saves, e.g., job control information and print data associated with a print job received from a client computer.

The external interface unit 208 interfaces the server PC 102, client PC 103, and core unit 211. Job control data and image data are transmitted/received to/from the client PC 103 via the external interface unit 208. The job control data contains a job control instruction transmitted together with PDL data. An example of the job control data is data for expanding PDL data into image data, printing the image data, and delivering a print sheet after stapling and sorting.

The formatter unit 209 is connected to the core unit 211, and expands PDL data transmitted from a computer into image data printable by the printer unit 202. The image memory unit 210 temporarily accumulates information from the reader unit 201 and information transmitted from a computer via the external interface unit 208.

The core unit 211 controls data and the like flowing between the reader unit 201, operation unit 204, facsimile unit 205, file unit 206, external interface unit 208, PDL formatter unit 209, and image memory unit 210, and analyzes job control data. The core unit 211 comprises a CPU, memory, and the like, and executes a predetermined program by, e.g., the CPU to control the respective units.

The print history information (to be also simply referred to as a print history) will be explained. The print history is information in which the use history of a printing apparatus (e.g., multi function printer 101) for each user is accumulated in, e.g., the multi function printer 101 or client PC 103. The print history has a format as shown in FIG. 6. The print history is recorded for each print job, and has items such as an identifier unique to an apparatus which accumulates a print history, the user name (owner name) of a print job, the total number of pages, the paper size, the print color, the printing method, and the print result. Needless to say, the print history may have other items such as use/non-use of a finisher and the process time. When the print history is accumulated in the multi function printer 101, it is accumulated and saved as the print history information 207a in the external storage device 207.

<Configuration of Computer>

Figure 3:
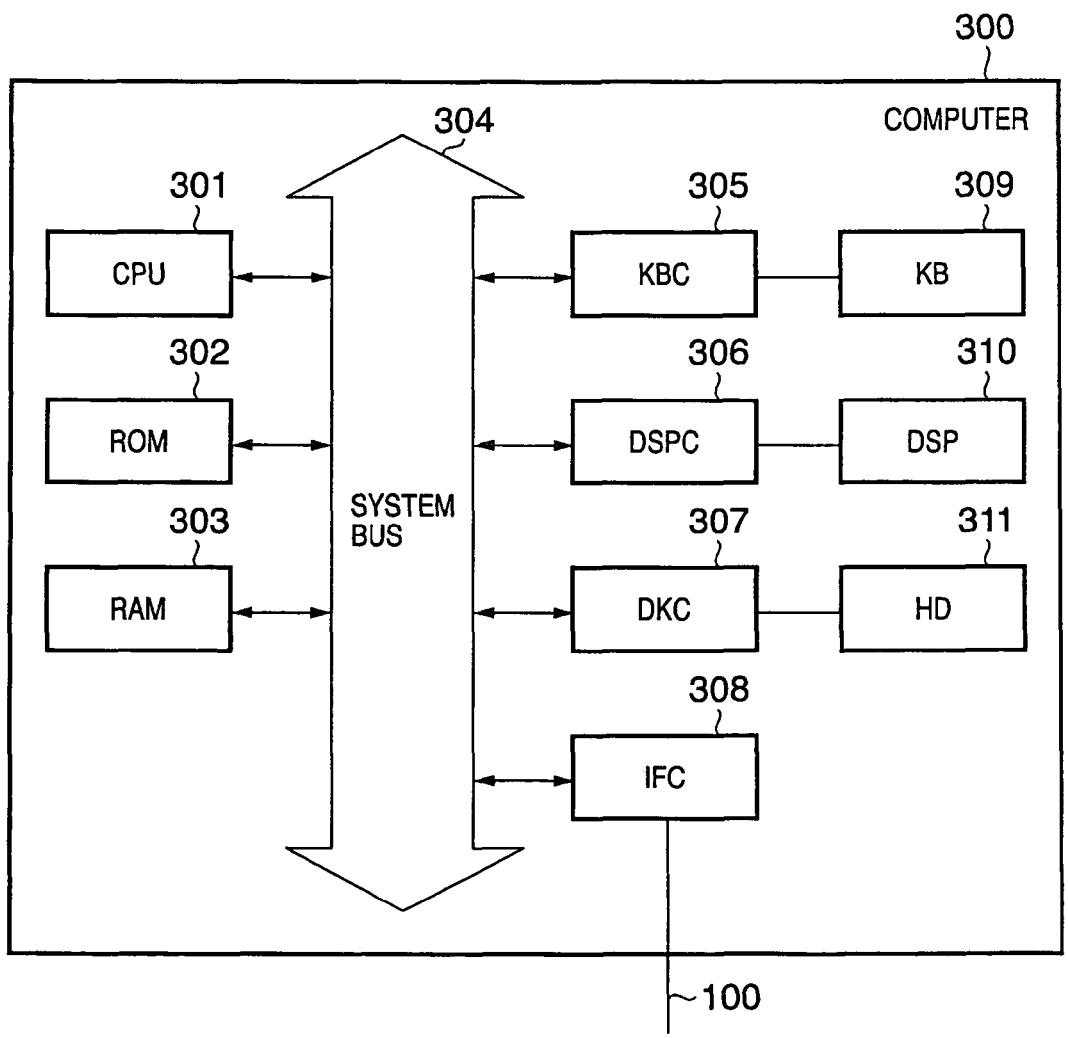
FIG. 3 is a block diagram showing the internal configuration of a PC.

FIG. 3 is a block diagram showing the internal configurations of the server PC 102 and client PC 103. In FIG. 3, a PC 300 is the server PC 102 or client PC 103. The PC 300 comprises a CPU 301 which executes the program of the printing control system stored in a ROM 302 or hard disk (HD) 311 or supplied from a flexible disk drive (not shown). The PC 300 comprehensively controls functional blocks connected to a system bus 304.

Reference numeral 303 denotes a RAM which functions as a main memory, work area, and the like for the CPU 301. Reference numeral 305 denotes a keyboard controller (KBC) which controls instruction inputs from a keyboard (KB) 309, pointing device (not shown), and the like. Reference numeral 306 denotes a display controller (DSPC) which controls display of a display (DSP) 310. Reference numeral 307 denotes a disk controller (DKC) which controls access to a storage device such as a CD-ROM (not shown), the hard disk (HD) 311, or a flexible disk controller (not shown). The hard disk (HD) 311, flexible disk controller, and the like store a boot program, an operating system, a printer driver, various applications, an edit file, a user file, and the like. Reference numeral 308 denotes an interface controller which exchanges information with the multi function printer 101 via the LAN 100.

<Printer Driver Setting Information Creation Process>

Figure 4:
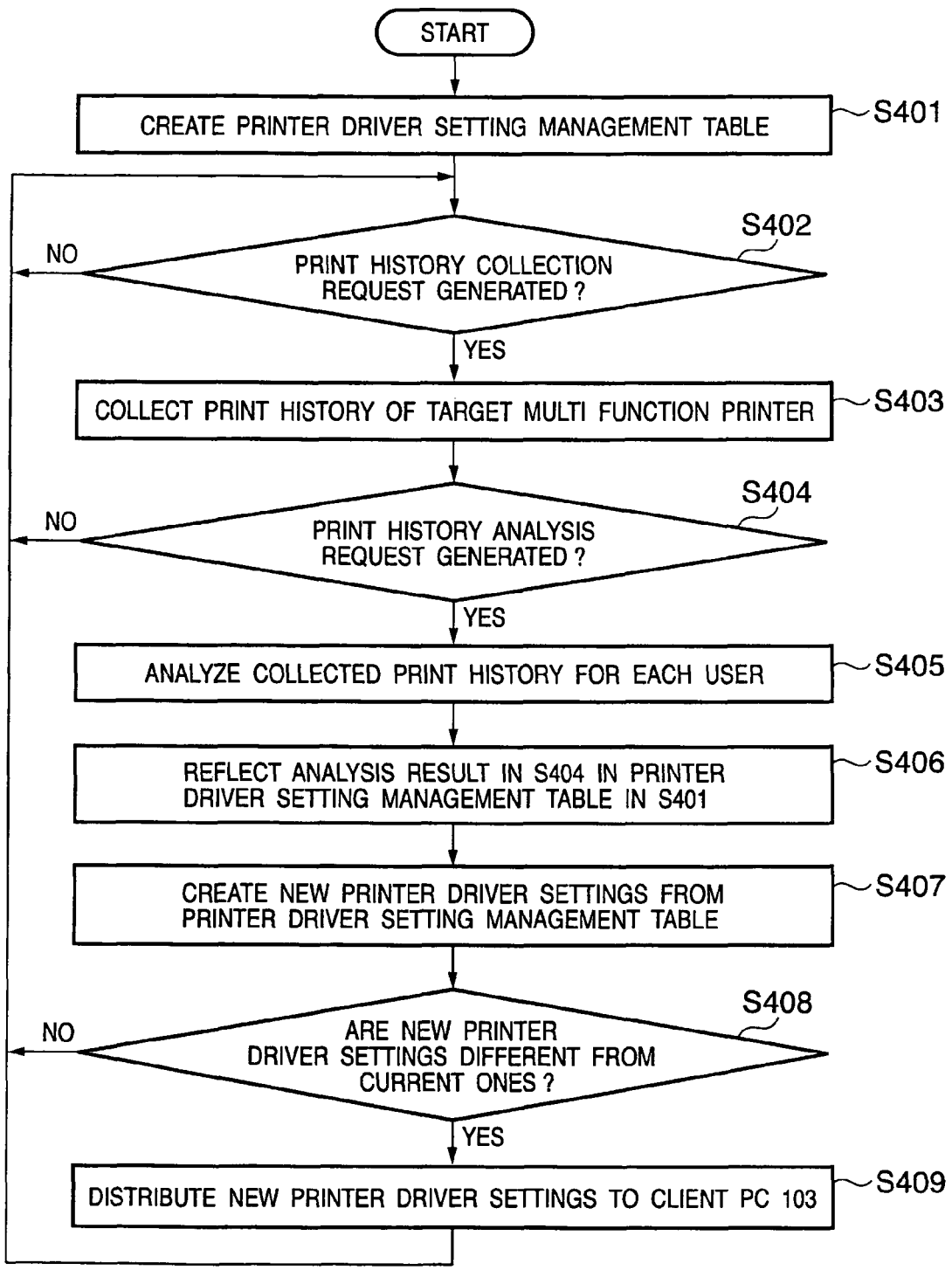
FIG. 4 is a flowchart showing an operation according to the first embodiment.

FIG. 4 is a flowchart for explaining an operation, especially a printer driver setting information creation process by the program of the printing control system that runs on the server PC 102. A series of processes are determined and executed by the CPU 301 in the server PC 102 in hardware. The printer driver setting information is the default values (also called initial values) of print setting parameters (called print setting information) transferred to the printer driver in printing. The user can change the print setting information in issuing a print instruction. When the print setting information is not changed, default print setting information is directly used. The printer driver setting information is installed as part of the printer driver in the computer. Alternatively, the printer driver setting information is transmitted from the server to the client in which the information is installed. In this case, it is desirable that the printer driver setting information can be installed independently of the program file of the printer driver.

When the program of the printing control system runs on the server PC 102, it executes step S401. In step S401, a printer driver setting management table is created as a preparation to execute step S402 and subsequent steps. The creation result is stored in the RAM 303. Note that the printer driver setting management table is stored in the RAM 303 in the first embodiment, but may be stored in the hard disk 311 or a removable storage device such as a flexible disk or USB memory. In step S401, an input window which prompts the operator to input items except a current value 504 in the printer driver setting management table shown in FIG. 5 is displayed on the display 310. After the operator inputs items, the input values are saved in a format as shown in FIG. 5. In some cases, a plurality of values are input for one item, like a restricted item 503 and related item 507. For such an item, the input window provides an input column for inputting a plurality of values.

(Printer Driver Setting Management Table)

FIG. 5 shows an example of the printer driver setting management table created in step S401. In FIG. 5, reference numeral 500 denotes a printer driver setting management table itself. In this example, the printer driver setting management table corresponds to a user name 501 "Suzuki" and a target printer 502=the multi function printer 101. One printer driver setting management table is set for a combination of the user and printer. In FIG. 5, the user name 501 and printer name 502 are also registered as indices of the table. However, these indices suffice to be registered separately from the printer driver setting management table and associated with it.

Elements which form the printer driver setting management table 500 are the restricted item 503, the current value 504, an upper limit 505, an allowable maximum value 506, the related item 507, a standard value 508, a value 509 within the allowable maximum value, and a value 510 exceeding the allowable maximum value. Like the example of FIG. 10, the printer driver setting management table 500 may include the user name 501 and printer name 502.

The restricted item 503 stores the identifier of an item (item identifier) for which printing is restricted, i.e., an item which is subjected to a print restriction in the printing control system according to the first embodiment. In FIG. 5, "the number of print sheets" and "color ratio" are illustrated as restricted items.

The current value 504 stores the current value of a print-restricted item designated by the restricted item 503. In general, the current value 504 can be obtained by analyzing a print history (to be described later). In FIG. 5, "110 sheets" is stored as "the number of print sheets", and "40%" is stored as "color ratio".

The upper limit 505 sets the upper limit of a print-restricted item designated by the restricted item 503. In FIG. 5, "100 sheets" are set as the upper limit of "the number of print sheets", and "50%" is stored as the upper limit of "color ratio". The upper limit is a so-called first threshold. The upper limit represents the upper limit of a restricted item for which a print process can be done without any restriction. "No restriction" means not that no restriction is imposed, but that no restriction is imposed even if the current value of a restricted item exceeds the upper limit 505, and no restriction is imposed even if the current value of the restricted item exceeds the allowable maximum value 506 to be described below. Another restriction may be imposed. If the current value of the restricted item exceeds its upper limit, a restriction in the first stage that is defined separately for the print process is imposed.

The allowable maximum value 506 sets what allowable maximum value is given in performing printing exceeding the upper limit of a print-restricted item designated by the restricted item 503. The allowable maximum value is a threshold equal to or larger than the "upper limit", and is a so-called second threshold. The allowable maximum value 506 is generally set to a value serving as a restriction looser than that imposed by the upper limit 505. However, the allowable maximum value 506 can also be set equal to the upper limit 505. It is not permitted to set the allowable maximum value 506 to a restriction value smaller than the upper limit 505. Input of the allowable maximum value 506 smaller than the upper limit 505 is inhibited in step S401. Even if the input is permitted, for example, the value of the allowable maximum value 506 is regarded to be equal to the upper limit 505, and a process in step S407 to be described later is performed.

The allowable maximum value 506 is a threshold for defining the stage of the restriction imposed on the print process when the value of a restricted item exceeds the upper limit 505. If the current value of the related item exceeds the allowable maximum value 506, a restriction in the second stage that is defined separately for the print process is imposed.

In FIG. 5, the allowable maximum value of "the number of print sheets" is set to "120 sheets". Even if the current value exceeds the upper limit, 20 sheets can be printed. The allowable maximum value of "color ratio" is set to "60%". Even if the ratio of color printing exceeds 50%, printing can continue until the color ratio reaches 60%.

The related item 507 lists printer driver setting items associated with the restricted item 503. In FIG. 5, "page layout", "printing method", and "paper size" are listed for "the number of print sheets" in the restricted item 503. Related items are printer driver setting items to which the above-mentioned restrictions in the first and second stages are applied.

The standard value 508 sets a value applied when the current value 504 is equal to or smaller than the upper limit 505 for each item listed in the related item 507.

The value 509 within the allowable maximum value sets a value applied when the current value 504 is larger than the upper limit 505 but is equal to or smaller than the allowable maximum value 506 for each item listed in the related item 507. That is, the value 509 represents the above-described first restriction.

The value 510 exceeding the allowable maximum value sets a value applied when the current value 504 is larger than the allowable maximum value 506 for each item listed in the related item 507. That is, the value 510 represents the above-described second restriction.

Note that character strings "(variable)" and "(fixed)" are described in the standard value 508, the value 509 within the allowable maximum value, and the value 510 exceeding the allowable maximum value. These values are also input in step S401, and the character strings are implemented by, e.g., flags corresponding to items having the character strings. The flag is reflected as the "mode" of a corresponding item in printer driver setting information when the printer driver setting information is created on the basis of the printer driver setting management table 500 of FIG. 5. The "mode" means whether the user can change the value of the item when he prints using the printer driver setting information. For example, for an item of "variable value", the user can change and save the value of the item. For an item of "fixed value", the user can change the value of the item and print, but cannot save the changed value.

Other building elements of the printer driver setting management table 500 are information of the client PC of the user of the user name 501, printer information of the target printer 502, and printer driver information of the printer of the target printer 502, and a description thereof will be omitted.

Referring back to the flowchart of FIG. 4, in step S402, the server PC 102 accesses the multi function printer 101 via the LAN 100, and determines whether a history collection request (to be also simply referred to as a collection request) to acquire a print history stored in the external storage device 207 of the multi function printer 101.

The history collection request may be issued by an operation on a window generated by the program of the printing control system in accordance with an operation by the administrator of the printing control system (i.e., in accordance with a request from the administrator). The history collection request may be issued periodically at some time break, such as the weekend or the end of the month, by using a schedule function prepared by the program of the printing control system. Alternatively, the history collection request may be issued in accordance with generation of a predetermined event, for example, when a printer driver is installed or a print job is generated. The history collection request can also be issued at another timing, and the timing is not limited to the above examples.

If the collection request is generated in step S402, the flow advances to step S403; if no collection request is generated in step S402, returns to step S402.

In step S403, the server PC 102 accesses the multi function printer 101 via the LAN 100, and acquires the print history 207a stored in the external storage device 207 of the multi function printer 101. The acquisition result is stored in the RAM 303. Note that the print history is stored in the RAM 303 in the first embodiment, but may be stored in the hard disk 311 or a removable storage device such as a flexible disk or USB memory. If a plurality of printing apparatuses are available, pieces of history information of the available printing apparatuses are acquired.

(Print History Information)

FIG. 6 is a table showing an example of the print history information which is acquired in step S403 and stored in the RAM 303. FIG. 6 shows an example of print history information of the multi function printer 101. In FIG. 6, reference numeral 600 denotes an entire print history. Elements which form the print history 600 are an ID 601, user name 602, total page count 603, paper size 604, print color 605, printing method 606, and print result 607.

The ID 601 is a number for uniquely identifying a set in time series, i.e., a print job in the print history. The ID 601 can be an arbitrary number as far as the number is unique to one printing apparatus. The user name 602 stores the user identifier of the user of a print job. Note that the user identifier stored in the user name 602 is expected to be identical to the value of the user name 501 shown in FIG. 5. The total page count 603 stores the number of print pages of a print job. The paper size 604 stores the size of paper used in a print job. The print color 605 stores whether a print job is processed in color or monochrome. The printing method 606 stores whether a print job is executed in single- or double-sided printing. The print result 607 stores the result of executing a print job. The print result 607 is not limited to "successful" or "failed", but may contain a more detailed result such as an error code upon failure.

Since FIG. 6 shows history information loaded into a computer, a printer ID 608 is added to identify which printing apparatus corresponds to the history information. However, the history accumulated in the printing apparatus may not contain the printer ID 608. The printer ID 608 is the identifier of a designated printing apparatus when the computer designates a printing apparatus and collects history information in step S403 of FIG. 4.

Other building elements of the print history are a document name, print department, print date & time, and job status, and a description thereof will be omitted.

Referring back to the flowchart of FIG. 4, after the server PC 102 stores the print history 600 in the RAM 303 in step S403, it executes step S404. In step S404, the server PC 102 determines whether a print history analysis request is generated. The print history analysis request may be issued on a window generated by the program of the printing control system in accordance with an operation by the administrator of the printing control system. The print history analysis request may be issued periodically at some time break, such as the weekend or the end of the month, by using the schedule function prepared by the program of the printing control system. Alternatively, the print history analysis request may be issued in accordance with generation of a predetermined event. When a print history information collection request is generated, a print history information analysis request may be unconditionally regarded to be generated. In this case, step S404 can be substantially omitted. The analysis request may be generated on the basis of other factors, and the factor is not limited to the above ones. If an analysis request is generated in step S404, the flow advances to step S405; if no analysis request is generated in step S404, returns to step S402.

In step S405, the print history collected in step S403 is analyzed, and the building elements of the print history are totalized for each printer and each user. In totalization, for example, the following values are totalized for each printer and each user: (1) the total number of print pages (i.e., the number of print sheets), (2) the number of print pages for each paper size, (3) the numbers of color and monochrome pages and the number of color pages/the total number of pages (i.e., color ratio), (4) the number of pages by each printing method, and (5) the number of successful jobs and the number of failed jobs.

These total values are saved in, e.g., the RAM 303. In step S406, of the total values, the value of an item corresponding to a "restricted item" in the printer driver setting management table 500 is stored in the corresponding current value 504. More specifically, values are read from the total values for each user and each printer, and written as the current values of corresponding items in a printer driver setting management table corresponding to the user name and printer name. For example, in the table of FIG. 5, the user name is "Suzuki", the printer name is "multi function printer 101", and restricted items are two items "the number of print sheets" and "color ratio". Attention is given to a printer driver setting management table corresponding to the user name "Suzuki" and the printer name "multi function printer 101", and the identifiers of the restricted items "the number of print sheets" and "color ratio" in the management table are read. The values of the items corresponding to the identifiers are read from values totalized for the user name "Suzuki" and the printer name "multi function printer 101". The read values are written in the restricted items "the number of print sheets" and "color ratio" in the printer driver management table corresponding to the user name "Suzuki" and the printer name "multi function printer 101".

In step S407, each current value 504 stored in step S406 is compared with the upper limit 505 and allowable maximum value 506, and new printer driver settings (also called printer driver setting information) for each user are created for each printer. In creating new printer driver setting information, the setting value of a "related item" registered in the printer driver setting management table among items belonging to the printer driver setting information is restricted by a value registered in the printer driver setting management table. More specifically, if the current value of a restricted item value is equal to or smaller than the upper limit, a "standard value" is written in an item related to the restricted item in the printer driver setting information. If the current value of the restricted item value is larger than the upper limit but is equal to or smaller than the allowable maximum value, a "value within the allowable maximum value" is written in the item related to the restricted item in the printer driver setting information. If the current value of the restricted item value in the printer driver setting information exceeds the allowable maximum value, a "value exceeding the allowable maximum value" is written in the item related to the restricted item. In an item not corresponding to a related item, a separately prepared default value is written. The value (variable/fixed) of a flag corresponding to a related item is written as the mode of the item in the printer driver setting information. In this manner, the printer driver setting information is created. The creation result is stored in the RAM 303. Note that new printer driver setting information is stored in the RAM 303 in the first embodiment, but may be stored in the hard disk 311 or a removable storage device such as a flexible disk or USB memory.

(Printer Driver Setting Information)

FIG. 7 shows an example of the printer driver setting information created in step S407. In the printing control system according to the present invention, a printer driver is distributed to the client PC 103 after customized to setting values shown in FIG. 7. In FIG. 7, reference numeral 700 denotes entire printer driver setting information. Elements which form the printer driver setting information 700 are a function 701, setting value 702, and mode 703.

The function 701 is a settable item of the printer driver. In FIG. 7, the function 701 includes "page layout", "printing method", "paper size", "print color", "print quality", and "toner saving". However, the function 701 is not limited to them.

The setting value 702 is the value of a settable item of the printer driver represented by the function 701.

The mode 703 defines whether the user of the client PC 103 can print by changing the setting value 702 on the window of a printer driver distributed to the client PC 103. When the mode 703 is "fixed", the setting value 702 cannot be changed on the window of the printer driver. When the mode 703 is "variable", the user can print by changing the setting value 702 on the window of the printer driver. However, the printer driver setting information 700 itself distributed to the client PC 103 cannot be changed, and only a temporal change for printing is permitted. In other words, the default values of print setting information cannot be changed.

Referring back to the description of step S407 in FIG. 4, a method of creating the setting value 702 and mode 703 of printer driver settings will be explained. In the printer driver setting management table 500 of FIG. 5, the current value 504 corresponding to the restricted item 503 is "110 sheets", which is larger than the upper limit 505 of "100 sheets" and smaller than the allowable maximum value 506 of "120 sheets". A value described in the value 509 within the allowable maximum value should be employed in a new printer driver setting. Hence, the setting value 702 and mode 703 in new printer driver settings are changed to "2 pages/sheet"/ "variable" for "page layout", "double-sided"/"variable" for "printing method", and "A4"/"variable" for "paper size".

In step S408, the new printer driver settings created in step S407 are compared with the current ones. Note that the current printer driver settings can be acquired by the following method, but the method is not limited to this.

(1) The server PC 102 acquires current printer driver settings from the client PC 103 via the LAN 100.

(2) In distributing the printer driver settings, the server PC 102 saves them for each user name 501 and each target printer 502 in the printer driver setting management table 500. The saved data are acquired.

If the current printer driver settings are different from the new ones in step S408, the flow advances to step S409; if the current printer driver settings coincide with the new ones in step S408, returns to step S402.

In step S409, the printer driver settings created in step S407 are distributed from the server PC 102 to the client PC 103 via the LAN 100. After step S409 is executed, the flow returns to step S402 to repeat steps S402 to S409.

Upon reception of the printer driver settings, the client saves the received printer driver settings as, e.g., part of a user profile for each user. When a given user prints by using a given printer, printer driver setting information created for the user and the printer is used as default values of print setting information. When the user performs a change operation, he is permitted to change an item whose mode has a variable value and inhibited from changing, from a default value, an item whose mode has a fixed value. Print setting information is created in accordance with the default values and change operation. Print data is generated in accordance with the print setting information and transmitted to the printer to execute printing.

Note that the program of the printing control system runs in the server PC 102 in the first embodiment, but may run in the multi function printer 101 or client PC 103. In these cases, processes via the LAN 100 in the description of the flowchart may be replaced with processes via the system bus, as needed, and a description thereof will be omitted. Also, the print history 600 is collected by the server PC 102, but may be collected by the multi function printer 101, client PC 103, or arbitrary PC. In these cases, the print history 600 suffices to be exchanged between the server PC 102 and these devices via the LAN 100, and a description thereof will be omitted.

By the above configuration and procedures, the default values of print settings can be flexibly changed in accordance with the use status of each user. Accordingly, a print restriction can be imposed on each user, and the user can obey it. Since a printer driver management table can be created for each user and each printer, a print restriction can be more flexibly set in accordance with the user.

Second Embodiment

The second embodiment of the present invention will be explained with reference to the accompanying drawings. In addition to the operation described in the first embodiment, the second embodiment will explain an operation when a printer driver setting management table 500 is updated after a printer driver is distributed. In the second embodiment, the configuration of a printing control system, the internal configuration of a multi function printer 101, and the internal configurations of a server PC 102 and client PC 103 are completely the same as those in the first embodiment, and a description thereof will be omitted.

Figure 8:
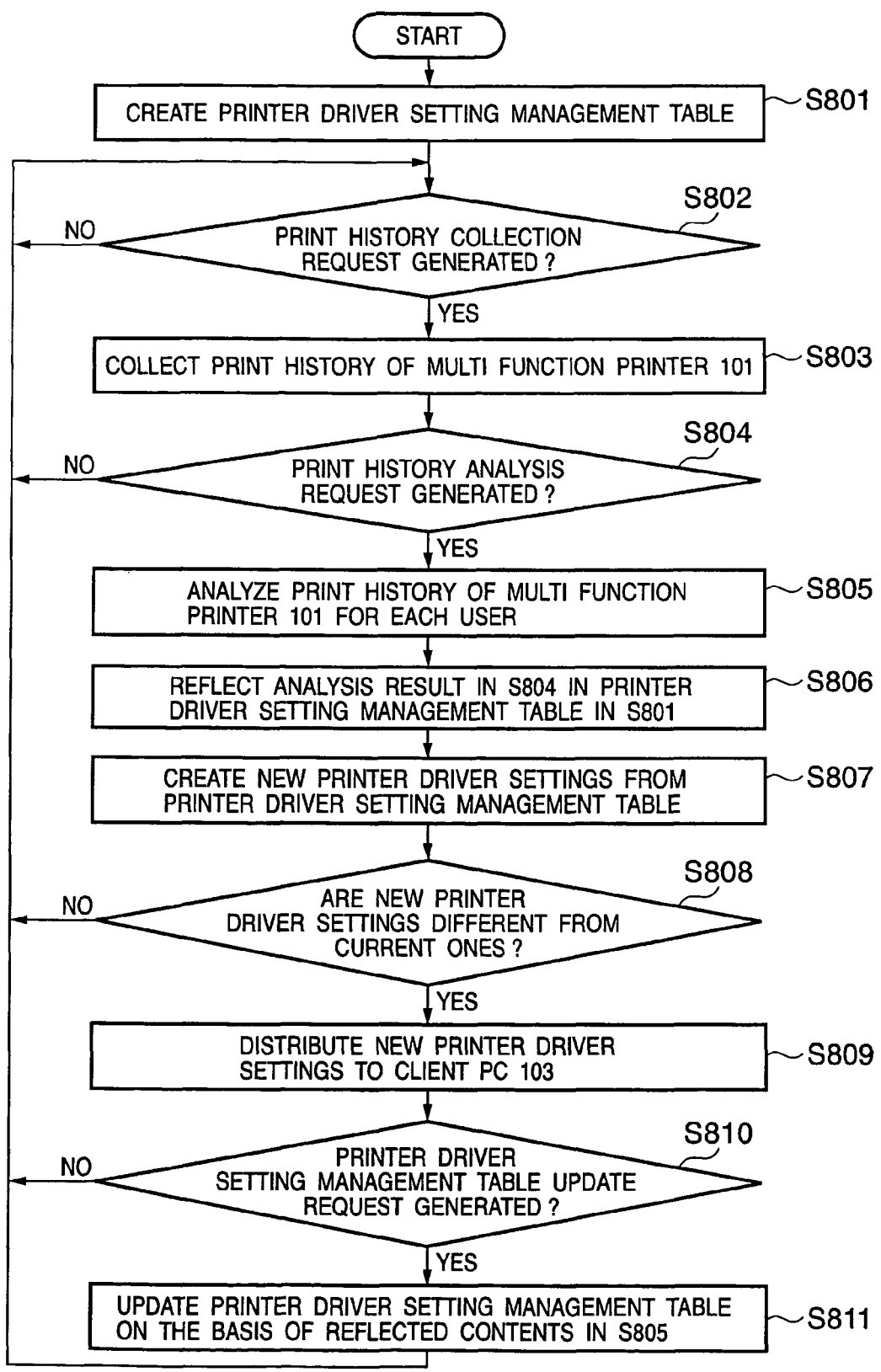
FIG. 8 is a flowchart showing an operation according to the second embodiment.

FIG. 8 is a flowchart for explaining an operation of the program of the printing control system that runs on the server PC 102. A series of processes are determined and executed by a CPU 301 in the server PC 102 in hardware.

In this flowchart, steps S801 to S809 are identical to steps S401 to S409 in FIG. 4 according to the first embodiment, and a description thereof will be omitted.

In step S810, it is determined whether a request to update the contents of the printer driver setting management table 500 is generated. The update request may be issued on a window generated by the program of the printing control system in accordance with an operation by the administrator of the printing control system. The update request may be issued periodically at some time break, such as the weekend or the end of the month, by using a schedule function prepared by the program of the printing control system. Alternatively, the update request may be issued in accordance with generation of an event to change the contents of the printer driver setting management table. However, the issuing method is not limited to the above ones.

If the update request is generated in step S810, the flow advances to step S811; if no update request is generated in step S810, returns to step S802.

In step S811, the contents of the printer driver setting management table 500 are updated on the basis of a current value 504 stored in the printer driver setting management table 500 in step S806. FIG. 9 shows an example of an update rule management table which describes an update rule in updating the printer driver setting management table 500 in step S811.

In FIG. 9, an update rule management table 900 is saved in a RAM 303, ROM 302, hard disk 311, or the like. Elements which form the update rule management table 900 are a restricted item 901 and rule 902. The restricted item 901 is identical to a restricted item 503 of the printer driver setting management table 500. As examples of the restricted item 901, FIG. 9 shows "the number of print sheets" and "color ratio".

The rule 902 defines a rule for automatically determining an upper limit 505 and allowable maximum value 506 associated with each item in the restricted item 901. FIG. 9 shows rules for determining the upper limits 505 and allowable maximum values 506 of "the number of print sheets" and "color ratio" serving as examples of the restricted item 901. For example, as for the number of print sheets, when the current value exceeds the allowable maximum value, the upper limit is changed to the product of the current upper limit by 0.9, and the allowable maximum value is changed to the sum of the upper limit and 15. If the current value falls between the upper limit and the allowable maximum value, the upper limit is changed to the product of the current upper limit by 0.9. Although this substantially applies to the color ratio, the value of the allowable range is increased by 10% of the upper limit. In this example, the rule 902 is described in accordance with the grammar of the C language, but the grammar which describes the rule 902 is not limited to this. The description method is arbitrary as far as a rule as shown in FIG. 9 can be described and interpreted to update the printer driver management table.

Figure 10:
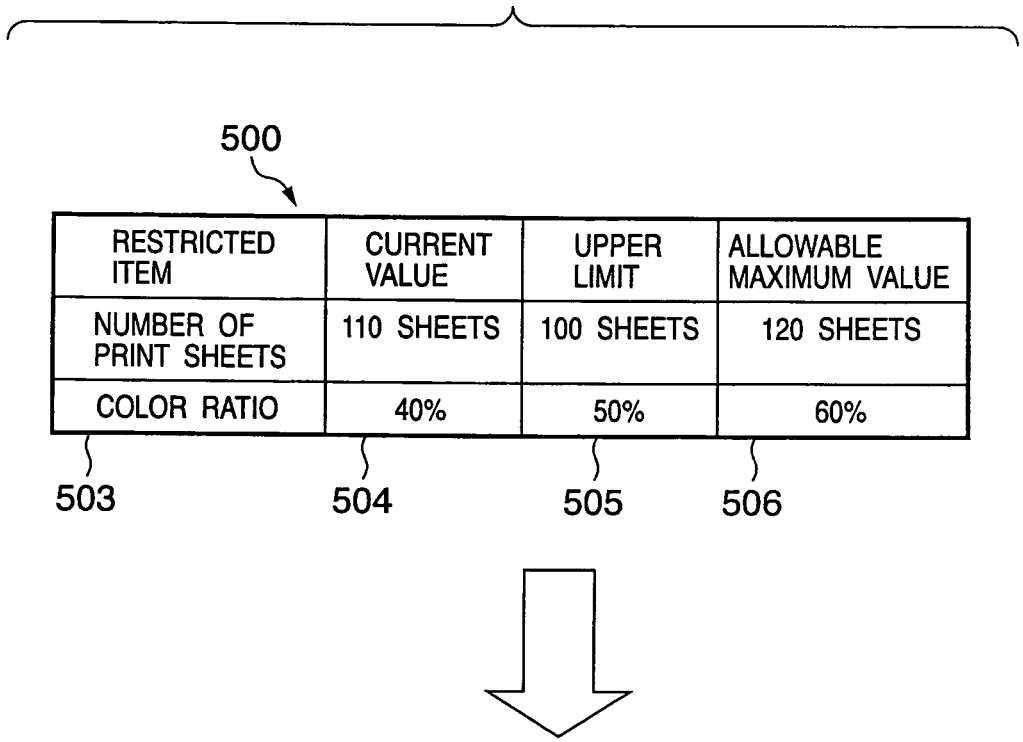
FIG. 10 is a table showing an application example of an update rule.

FIG. 10 shows a change of the upper limit 505 and allowable maximum value 506 in the printer driver setting management table 500 shown in FIG. 5 in accordance with the rule 902 of the update rule management table 900 shown in FIG. 9. The result of applying the rule 902 is shown in the lower part of FIG. 10, and reveals that the upper limit of the restricted item "the number of print sheets" is changed from "100 sheets" to "90 sheets".

Referring back to the flowchart of FIG. 8, after step S811 is executed, the flow returns to step S802 to repeat steps S802 to S811.

Note that the program of the printing control system runs in the server PC 102 in the second embodiment, but may run in the multi function printer 101 or client PC 103.

In these cases, processes via a LAN 100 in the description of the flowchart may be replaced with processes via the system bus, as needed, and a description thereof will be omitted.

Also, a print history 600 is collected by the server PC 102, but may be collected by the multi function printer 101, client PC 103, or arbitrary PC. In these cases, the print history 600 suffices to be exchanged between the server PC 102 and these devices via the LAN 100, and a description thereof will be omitted.

By the above configuration and procedures, the default values of print settings can be flexibly changed in accordance with the use status of each user. Accordingly, a print restriction can be imposed on each user, and the user can obey it. Since a printer driver management table can be created for each user and each printer, a print restriction can be more flexibly set in accordance with the user.

In addition, the printer driver management table is changed in accordance with the use status of the user, so a condition to change the default value of a print setting can be further changed.

<Other Embodiments>

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-136502 filed on May 9, 2005, which is hereby incorporated by reference herein in its entirely.

What is claimed is:

1. A printing control apparatus which generates print setting information for a print process in a printing apparatus, comprising:
    a management table creation unit configured to create, for each user, a setting management table in which a print setting value is related to a range of a value defined by a threshold for controlling printing based on results value of the print process, wherein the one threshold is at least set corresponding to a setting item which is included in the print setting information;
    an acquiring unit configured to acquire a current result value of the print process by using history information recorded by the printing apparatus, wherein the history information is acquired in response to a request periodically issued by the printing control apparatus;
    a read unit configured to read a print setting value from the setting management table, wherein the print setting value is related to the range of the value to which the current result value acquired by said acquiring unit belongs;
    a creation unit configured to create new print setting information containing the print setting value read by said read unit;
    a storage unit configured to hold the print setting information that is saved as current print setting information;
    a comparison unit configured to compare the new print setting information created by said creation unit with the current print setting information held in said storage unit;
    a distribution unit configured to distribute a printer-driver-set to a client computer and save the new print setting information in said storage unit as the current print setting information when the new print setting information is different from the current print setting information, wherein the new print setting information created by said creation unit is set to the printer driver as a default print setting,
    wherein a change of a print setting value of a print setting item is disabled when a mode of each print setting item in the print setting information created by said creation unit is fixed, and a change of the print setting value of the print setting item is enabled when the mode of each print setting item is variable, and
    wherein the new print setting information created by said creation unit is not saved in said storage unit and a printer-driver-set to which the new print setting information created by said creation unit is set is not distributed to a client computer when the new print setting information is the same to the current print setting information as a result of the comparison by said comparison unit.

2. The apparatus according to claim 1, further comprising:
    a setting acquisition unit configured to acquires current default print setting of a printer driver of said user, wherein when the pieces of print setting information created by said creation unit are to be different from the current default print setting acquired by said setting acquisition unit, said distribution unit distributes the print setting information created by said creation unit.

3. The apparatus according to claim 1, wherein said acquiring unit acquires the current result value by using history information collected from a information processing apparatus which communicates with the printing apparatus.

4. The apparatus according to claim 1, wherein the threshold is set corresponding to at least one of the number of print sheets and a color print.

5. The apparatus according to claim 1, wherein the print setting value read by said read unit is a setting value related to one of a page layout, a paper size, and a print color.

6. The apparatus according to claim 1, wherein the history information used by said acquiring unit is collected when the printer driver is installed.

7. A method of a printing control apparatus which generates print setting information for a print process in a printing apparatus, the method comprising:
    a management table creation step of creating, for each user, a setting management table in which a print setting value is related to a range of a value defined by a threshold for controlling printing based on results value of the print process, wherein the one threshold is at least set corresponding to a setting item which is included in the print setting information;
    an acquiring step of acquiring a current result value of the print process by using history information recorded by the printing apparatus, wherein the history information is acquired in response to a request periodically issued by the printing control apparatus;
    a read step of reading a print setting value from the setting management table, wherein the print setting value is related to the range of the value to which the current result value acquired by said acquiring step belongs;
    a creation step of creating new print setting information containing the print setting value read by said read step;
    a storage step of holding the print setting information that is saved as current print setting information;
    a comparison step of comparing the new print setting information created by said creation step with the current print setting information held in said storage step;
    a distribution step of distributing a printer-driver-set to a client computer and save the new print setting information in said storage step as the current print setting information, when the new print setting information is different from the current print setting information wherein the new print setting information created by said creation step is set to the printer driver as a default print setting,
    wherein a change of a print setting value of a print setting item is disabled when a mode of each print setting item in the print setting information created by said creation step is fixed, and a change of the print setting value of the print setting item is enabled when the mode of each print setting item is variable value,
    wherein the new print setting information created by said creation step is not saved in said storage step and a printer-driver-set to which the new print setting information created by said creation step is set is not distributed to a client computer when the new print setting information is the same to the current print setting information as a result of the comparison by said comparison step.

8. The method of a printing control apparatus according to claim 7, further comprising:
    a setting acquisition step of acquiring current default print setting of a printer driver of said user,
    wherein when the pieces of print setting information created by said creation step are to be different from the current default print setting acquired by said setting acquisition step, said distribution step distributes the print setting information created by said creation step.

9. The method of a printing control apparatus according to claim 7, wherein said acquiring step acquires the current result value by using history information collected from an information processing apparatus which communicates with the printing apparatus.

10. The method of a printing control apparatus according to claim 7, wherein the threshold is set corresponding to at least one of the number of print sheets and a color print.

11. The method of a printing control apparatus according to claim 7, wherein the print setting value read by said read step is a setting value related to one of a page layout, a paper size, and a print color.

12. The method, according to claim 7, wherein the history information used by said acquiring step is collected when the printer driver is installed.

13. A non-transitory computer-readable storage medium storing a computer-executable program for a printing control apparatus which generates print setting information for a print process in a printing apparatus, the program comprising:
    a management table creation step of creating, for each user, a setting management table in which a print setting value is related to a range of a value defined by a threshold for controlling printing based on results value of the print process, wherein the one threshold is at least set corresponding to a setting item which is included in the print setting information;
    an acquiring step of acquiring a current result value of the print process by using history information recorded by the printing apparatus, wherein the history information is required in response to a request periodically issued by the printing control apparatus;
    a read step of reading a print setting value from the setting management table, wherein the print setting value is related to the range of the value to which the current result value acquired by said acquiring step belongs;
    a creation step of creating new print setting information containing the print setting value read by said read step;
    a storage step of holding the print setting information that is saved as current print setting information;
    a comparison step of comparing the new print setting information created by said creation step with the current print setting information held in said storage step;
    a distribution step of distributing a printer-driver-set to a client computer and save the new print setting information in said storage step as the current print setting information when the new print setting information is different from the current print setting information, wherein the new print setting information created by said creation step is set to the printer driver as a default print setting,
    wherein a change of a print setting value of a print setting item is disabled when a mode of each print setting item in the print setting information created by said creation step is fixed, and a change of the print setting value of the print setting item is enabled when the mode of each print setting item is a variable, and
    wherein the new print setting information created by said creation step is not saved in said storage step and a printer-driver-set to which the new print setting information created by said creation step is set is not distributed to a client computer when the new print setting information is the same to the current print setting information as a result of the comparison by said comparison step.

14. The computer-readable storage medium storing a computer-executable program for a printing control apparatus according to claim 13, further comprising:
   a setting acquisition step of acquiring current default print setting of a printer driver of said user,
   wherein when the pieces of print setting information created by said creation step are to be different from the current default print setting acquired by said setting acquisition step, said distribution step distributes the print setting information created by said creation step.

15. The computer-readable storage medium storing a computer-executable program for a printing control apparatus according to claim 13, wherein said acquiring step acquires the current result value by using history information collected from an information processing apparatus which communicates with the printing apparatus.

16. The computer-readable storage medium storing a computer-executable program for a printing control apparatus according to claim 13, wherein the threshold is set corresponding to at least one of the number of print sheets and a color print.

17. The computer-readable storage medium storing a computer-executable program for a printing control apparatus according to claim 13, wherein the print setting value read by said read step is a setting value related to one of a page layout, a paper size, and a print color.

18. The computer-readable storage medium storing a computer-executable program for a printing control apparatus according to claim 13, wherein the history information used by said acquiring step is collected when the printer driver is installed.

* * * * *